US009989242B1

(12) United States Patent
Pradas et al.

(10) Patent No.: US 9,989,242 B1
(45) Date of Patent: Jun. 5, 2018

(54) UMBRELLA WITH FIBER OPTIC LIGHTS AND A FLASHLIGHT HANDLE

(71) Applicants: Kristyn Pradas, East Elmhurst, NY (US); Nickolas Duplantis, East Elmhurst, NY (US)

(72) Inventors: Kristyn Pradas, East Elmhurst, NY (US); Nickolas Duplantis, East Elmhurst, NY (US)

( * ) Notice: Subject to any disclaimer, the term of this patent is extended or adjusted under 35 U.S.C. 154(b) by 50 days.

(21) Appl. No.: 15/366,183

(22) Filed: Dec. 1, 2016

(51) Int. Cl.

| | |
|---|---|
| ***F21V 31/00*** | (2006.01) |
| ***F21V 33/00*** | (2006.01) |
| ***A45B 25/02*** | (2006.01) |
| ***A45B 25/18*** | (2006.01) |
| ***A45B 25/14*** | (2006.01) |
| ***F21L 4/02*** | (2006.01) |
| ***F21L 4/08*** | (2006.01) |
| ***F21V 21/40*** | (2006.01) |
| ***F21V 23/00*** | (2015.01) |
| ***F21V 23/04*** | (2006.01) |
| ***F21V 31/04*** | (2006.01) |
| ***F21V 8/00*** | (2006.01) |

(52) U.S. Cl.

CPC .......... *F21V 33/0004* (2013.01); *A45B 25/02* (2013.01); *A45B 25/14* (2013.01); *A45B 25/18* (2013.01); *F21L 4/02* (2013.01); *F21L 4/08* (2013.01); *F21V 21/406* (2013.01); *F21V 23/002* (2013.01); *F21V 23/0414* (2013.01); *F21V 31/04* (2013.01); *G02B 6/001* (2013.01); *A45B 2200/1018* (2013.01); *A45B 2200/1081* (2013.01)

(58) Field of Classification Search
None
See application file for complete search history.

(56) References Cited

U.S. PATENT DOCUMENTS

| | | | | |
|---|---|---|---|---|
| 4,872,468 A * | 10/1989 | Cole | A45B 3/04 | 135/16 |
| 2004/0007259 A1* | 1/2004 | Manolis | A45B 3/02 | 135/16 |
| 2006/0096625 A1* | 5/2006 | Chen | A45B 3/04 | 135/16 |
| 2011/0232703 A1* | 9/2011 | O'Hara | A45B 3/00 | 135/16 |
| 2015/0216273 A1* | 8/2015 | Akin | A45B 25/00 | 135/16 |
| 2017/0367448 A1* | 12/2017 | Solotoff | A45B 25/30 | |

* cited by examiner

*Primary Examiner* — Britt D Hanley
(74) *Attorney, Agent, or Firm* — Scarinci Hollenbeck LLC

(57) ABSTRACT

An umbrella, comprising a support pole including an upend end and a lower end, a canopy connected to the upper end of the support pole, the canopy including a plurality of struts that support a waterproof material and transition the canopy between an expanded open position and a contracted closed position, an upper handle unit permanently attached to the lower end of the support pole, the upper handle unit including an upper battery compartment, a lower handle unit removably attached to the upper handle unit, the lower handle unit including a lower battery compartment, a plurality of fiber optic lights embedded within the plurality of struts wired directly to and powered by the upper battery compartment, and a flashlight within the lower handle unit wired directly to and powered by the lower battery compartment.

14 Claims, 7 Drawing Sheets

100
102
103
101
107
107
107
107
102
102
102
102
104
105
106
108

104
500
105
205
307
306
310
106
309

UMBRELLA WITH FIBER OPTIC LIGHTS AND A FLASHLIGHT HANDLE

The application claims priority to U.S. Provisional Patent Application No. 62/371,265 filed Aug. 5, 2016 which is herein incorporated by reference in its entirety.

BACKGROUND

Various types of umbrellas with decorative lights emanating from the outer surface of the canopy or from within the handle are known in the prior art. However, what is need is an umbrella with fiber optic lights embedded within the underside of the canopy which effectively illuminate the area surrounding a person using the umbrella during inclement weather. Similarly, what is need is a directed source of light originating from the handle of the umbrella to illuminate the path ahead of the person using the umbrella and which may be removed and operated while separated from the handle to provide greater safety benefits during inclement weather. In conjunction with these needs is a need for separately controlling and charging the power sources for each of these lights within the umbrella. There is a need for all of the features to be provided within the existing and commonplace structural functionality of a standard umbrella, irrespective of it size or shape.

SUMMARY OF THE INVENTION

This invention responds to the above need of a new illuminated umbrella, to provide for an umbrella with fiber optic lights and a flashlight handle.

To achieve the above object, the technical solution is adopted for an umbrella comprising a support pole including an upper end and a lower end, a canopy connected to the upper end of the support pole, the canopy including a plurality of struts that support a waterproof material and transition the canopy between an expanded open position and a contracted closed position, an upper handle unit permanently attached to the lower end of the support pole, the upper handle unit including an upper battery compartment, a lower handle unit removably attached to the upper handle unit, the lower handle unit including a lower battery compartment, a plurality of fiber optic lights embedded within the plurality of struts wired directly to and electrically powered by the upper battery compartment, and a flashlight within the lower handle unit wired directly to and electrically powered by the lower battery compartment.

BRIEF DESCRIPTION OF THE DRAWINGS

This disclosure is further described in the detailed description that follows, with reference to the drawings, in which.

DETAILED DESCRIPTION

An exemplary embodiment of an umbrella with fiber optic lights and a flashlight handle is disclosed. As required, detailed embodiments of the present invention are disclosed herein however, it is to be understood that the disclosed embodiments are merely exemplary of the invention that may be embodied in various and alternative forms. The figures are not necessarily to scale and some features may be exaggerated or minimized to show details of particular components. Therefore, the structural and functional details disclosed herein are not to be interpreted as limiting, but merely as a representative basis for teaching one skilled in the art to variously employ the present invention.

Figure 1:
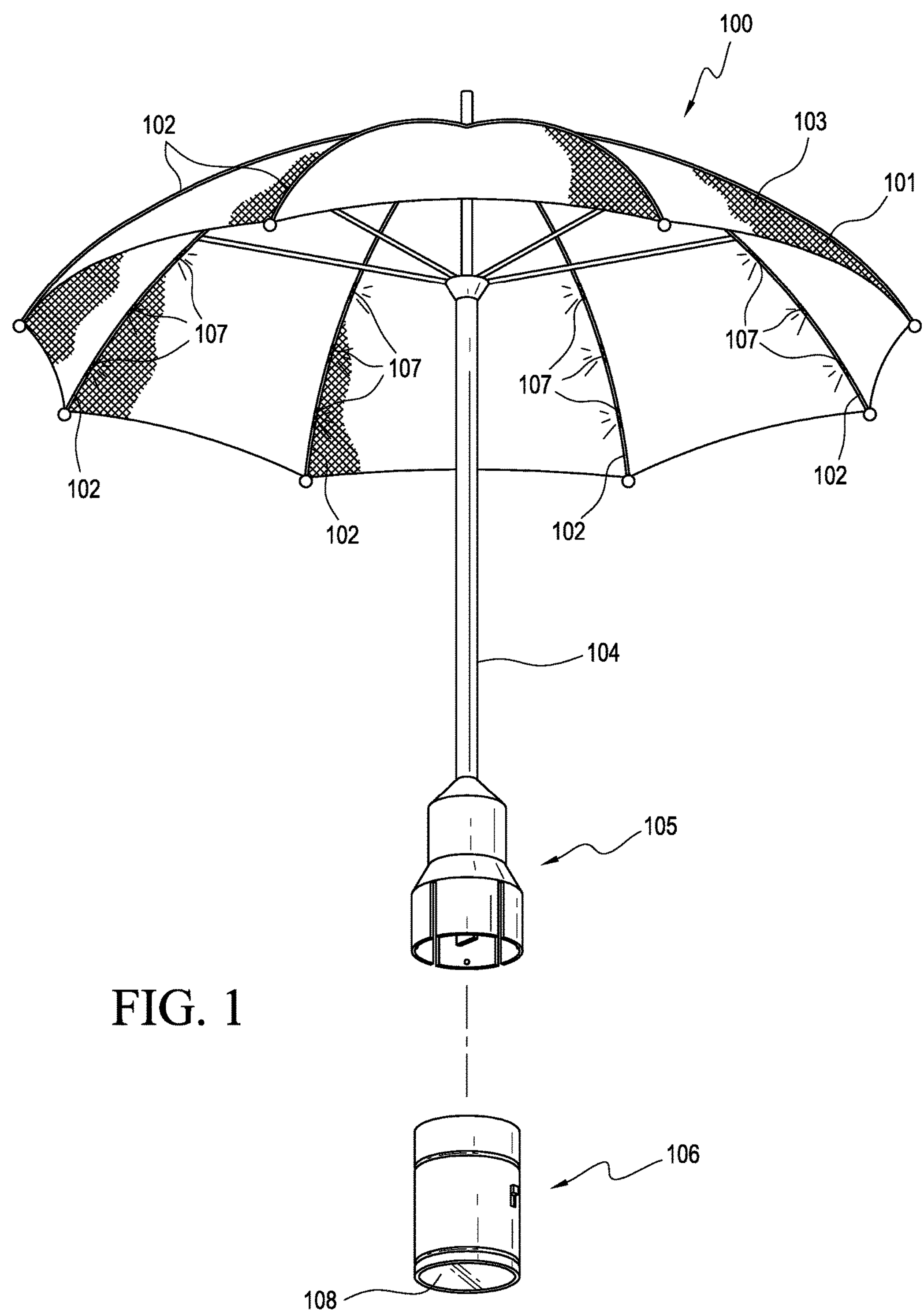
FIG. 1 depicts an exploded view of the umbrella with fiber optic lights and a flashlight handle according to an exemplary embodiment.

In FIG. 1, an exploded view of the umbrella with fiber optic lights and a flashlight handle is depicted according to an exemplary embodiment. As shown in FIG. 1, the umbrella 100 is comprised of a canopy 101, a support pole 104, an upper handle unit 105 and a lower handle unit 106. A plurality of support struts 102 are attached to an upper portion of the support pole 104 and thereby provide support to the canopy 101 at the upper end of the support pole 104. The support struts 102 also allow for the transition of the canopy 101 between an expanded open position and contracted closed position. The umbrella canopy 101 itself may be made of any durable waterproof fabric 103 known to one of relative skill in the art including nylon. The plurality of struts 102 may be made of any durable hard plastic or thin pliable metal also known to one of relative skill in the art. A series of fiber optic lights 107 are embedded within each of the struts 102. The fiber optic lights 107 are positioned within each of the struts 102 such that, when powered on, the fiber optic lights 107 provide an even and uniform illumination of the area under and surrounding the canopy 101. Moreover, the fiber optic lights 107 are mounted within each of the struts 102 in a manner that provides for a reasonable amount of protection against the surrounding environment including water when it is raining. The support pole 104 includes an inner shaft through which electrical cabling is run to provide electrical power to the fiber optic lights 107 from a power source positioned within the upper handle unit 105.

The upper handle unit 105 is permanently attached to a lower portion of the support pole 104. The lower handle unit 106 detachably couples to the upper handle unit 105 and includes an embedded flashlight 108 connected to a power source positioned within the lower handle unit 106.

Figure 2:
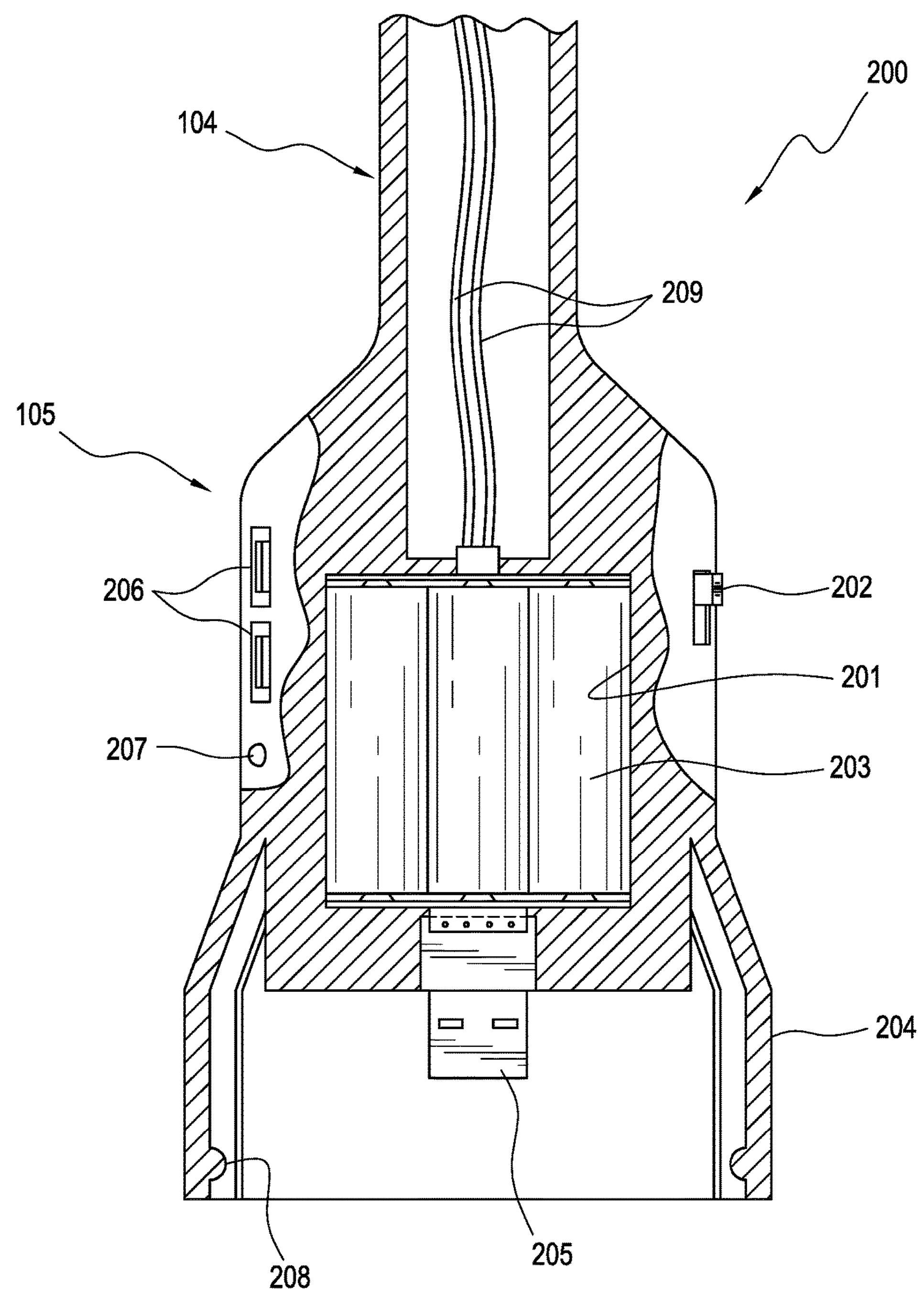
FIG. 2 depicts a conceptual diagram of the upper handle unit of the umbrella with fiber optic lights and a flashlight handle according to an exemplary embodiment.

In FIG. 2, a conceptual diagram of the upper handle unit of the umbrella with fiber optic lights and a flashlight handle is depicted according to an exemplary embodiment. As shown in FIG. 2, the upper handle unit 105 includes an upper battery compartment 201, a plurality of external Universal Serial Bus (USB) ports 206, a power switch 202, a charging light indicator 207, an internal male USB connector 205 and a set of spring loaded protrusions 208.

The upper battery compartment 201 is mounted within the upper handle unit 105 and is electrically connected to the fiber optic lights 107 via the electrical cabling 209 embedded within the support pole 104. Individual batteries 203 placed within the upper battery compartment 201 function as a power source for the fiber optic lights 107. The batteries 203 may be either disposable or rechargeable batteries.

The power switch 202 is mounted on the surface of the upper handle units 105 and is wired in series with the upper battery compartment 201 and the fiber optic lights 107 so as to control the application of electrical power to the fiber optic lights 107. The power switch 202 may include a dimmer unit that allows for controlling the brightness of the fiber optic lights 107. Alternatively, an external dimmer unit separate and apart from the power switch 202 may be installed in series with the power switch 202 for the same purpose.

The external USB ports 206 are mounted on the surface of the upper handle unit 105 and are electrically wired to the upper battery compartment 201 so as to allow for the charging of rechargeable batteries 203 positioned within the upper battery compartment 201 from an external power source. The USB ports 206 also allow for the charging of an external device using the batteries 203 positioned within the upper battery compartment 201 as a power source. Each of the external USB ports 206 may include a removable plastic or rubber cover that protects these ports from the surrounding environment including water when it is raining.

The charging light indicator 207 is wired in series with the external USB ports 206 and the upper battery compartment 201 to provide an indication of when these ports are providing a charge to rechargeable batteries 203 positioned within the upper battery compartment 201 versus when these batteries 203 are acting as a power source for the charging of an external device. The charging light indicator 207 also provides an indications of the status and progress of an ongoing charging progress.

The spring loaded protrusions 208 snap into aligned and complimentary connector groves within the lower handle unit 106 to securely hold in place the lower handle unit 106 when inserted into and coupled to the upper handle unit 105.

The internal male USB connector 205 provides an electrical connection between the upper battery compartment 201 in the upper handle unit 105 and a separate battery compartment located within the lower handle unit 106 when the lower handle unit 106 is inserted into and coupled to the upper handle unit 105.

Figure 3:
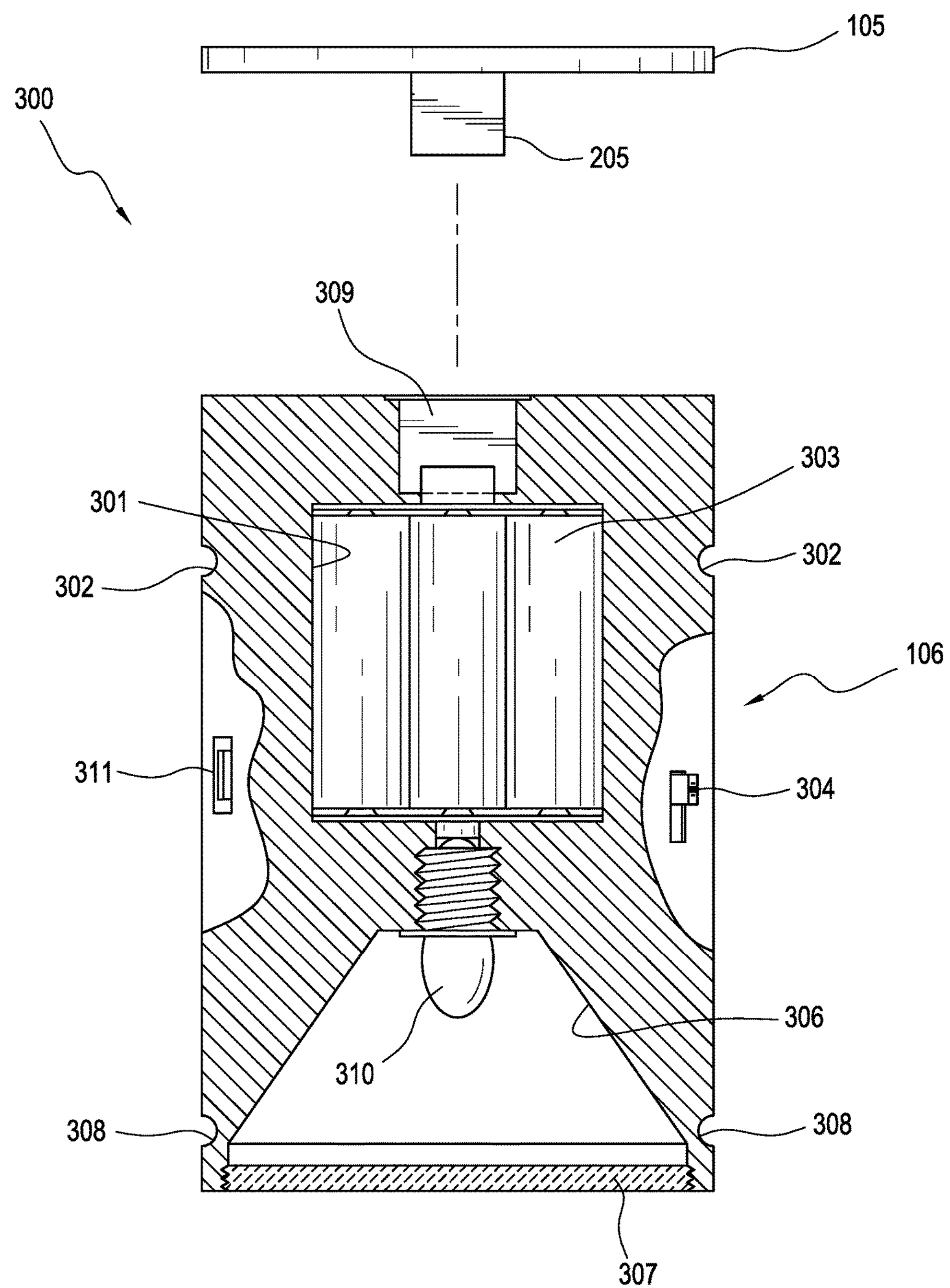
FIG. 3 depicts a conceptual diagram of the lower handle unit of the umbrella with fiber optic lights and a flashlight handle according to an exemplary embodiment.

In FIG. 3, a conceptual diagram of the lower handle unit of the umbrella with fiber optic lights and a flashlight handle is depicted according to an exemplary embodiment. As shown in FIG. 3, the lower handle unit 106 includes an internal USB port 309, a lower battery compartment 301, a flashlight enclosure 306, a flashlight power switch 304, an external USB port 311, an upper set of connection groves 302 and a lower set of connection grooves 308.

The internal USB port 309 is electrically connected to the lower battery compartment 301, the lower battery compartment 301 holding individual batteries 303 that are either disposable or rechargeable. Once the lower handle unit 106 is inserted into and coupled to the upper handle unit 105, rechargeable batteries 303 within the lower battery compartment 301 of the lower handle unit 106 may be recharged from the power source within the upper handle unit 105. Specifically, an electrical connection in made between the male USB connector 205 within the upper handle unit 105 and the USB port 309 within the lower handle unit 106. The charging occurs from the upper battery compartment 201 within the upper handle unit 105 to the lower battery compartment 301 within the lower handle unit 106 and not in the opposite direction. As such, in an exemplary embodiment, the upper battery compartment 201 in the upper handle unit 105 is designed to have a larger electrical capacity than the lower battery compartment 301 in the lower handle unit 106.

The lower battery compartment 301 is also connected to the external USB port 311 mounted on the outer surface of the lower handle unit 106. The external USB port 311 provides for recharging of rechargeable batteries 303 positioned within the lower battery compartment 301 from an external power source. This allows for recharging of rechargeable batteries 303 positioned within the lower battery compartment 301 whether or not the lower handle unit 106 is inserted into and coupled to the upper handle unit 105.

The flashlight enclosure 306 is wired to receive power from the lower battery compartment 301 in the lower handle unit 106. This allows for the flashlight 310 to operate whether or not the lower handle unit 106 is inserted into and coupled to the upper handle unit 105. The power switch 304 is wired in series with the flashlight enclosure 306 and the lower battery compartment 301 so as to control the application of electrical power to a bulb 310 inserted into the flashlight enclosure 306. The power switch 304 may include a dimmer unit that allows for controlling the brightness of the emitting from bulb 310 inserted into the flashlight enclose 306. Similarly, a dimmer unit separate and apart from the power switch 304 may be installed in series with the power switch 304 and the flashlight enclosure 306 for the same purpose.

A lens filter 307 may be removably attached to the open end of the flashlight enclosure 306 to help focus or filter the light emanating from the bulb 310 inserted writhing the flashlight enclosure 306.

A cover may be removably attached to the internal USB port 309 end of the lower handle unit 106. The cover providing protection from the outside environmental including water when it is raining and the internal USB port 309 end of the lower handle unit 106 is not inserted into and coupled to the upper handle unit 105.

The upper set of connection grooves 302 on the lower handle unit 106 are positioned to align with the spring loaded protrusions 208 on the upper handle unit 105. The spring loaded protrusions 208 extend outward and into the connection grooves 302 when the lower handle unit 106 is fully inserted into and coupled to the upper handle unit 105. When the lower handle unit 106 is fully inserted into the upper handle unit 105 in this first configuration, the USB connector 205 within the upper handle unit 105 is fully inserted into and electrically connected to the USB port 309 within the lower handle unit 106. The removable connection between the spring loaded protrusions 208 and the upper connection grooves 302 functions to maintain a secure coupling between the upper handle unit 105 and the lower handle units 106 in a first configuration.

The lower set of connection groves 308 are positioned to align with the spring loaded protrusions 208 in the upper handle unit 105 when the flashlight enclosure 306 end of the lower handle unit 106 is inserted into the upper handle unit 105. When the lower handle unit 106 is fully inserted into the upper handle unit 105 in this second configuration, the lens filter 307 at the end of the lower handle unit 106 does not come into contact with the internal USB connector 205 of the upper handle unit 105. While in this second configuration, the cover 311 is placed over the internal female USB connector 309 end of the lower handle unit 106 to provide protection from outside environmental conditions including rain. The removable connection between the spring loaded protrusions 208 and the lower connection grooves 308 maintaining a secure coupling between the upper handle unit 105 and the lower handle units 106 in this second configuration.

Figure 4:
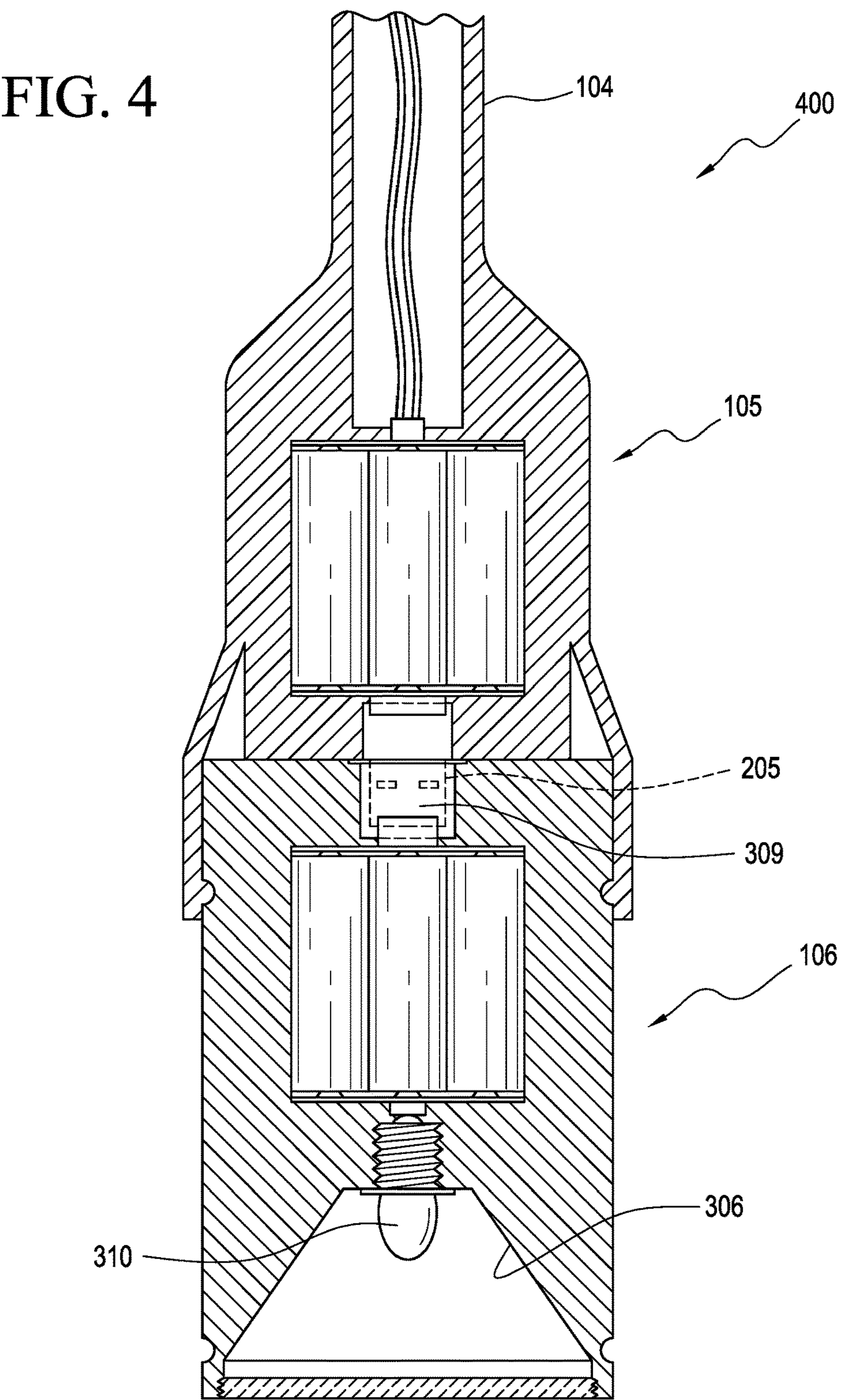
FIG. 4 depicts a conceptual diagram of the upper and lower handle units connected in a first configuration of the umbrella with fiber optic lights and a flashlight handle according to an exemplary embodiment.

In FIG. 4, a diagram of the upper handle unit 105 and the lower handle units 106 connected in the first configuration is depicted according to an exemplary embodiment. As shown in FIG. 4, the internal USB port 309 end of the lower handle unit 106 is inserted into the upper handle unit 105 with the internal USB connector 205 in the upper handle unit 105 inserted into the internal USB port 309 in the first configuration 400.

Figure 5:
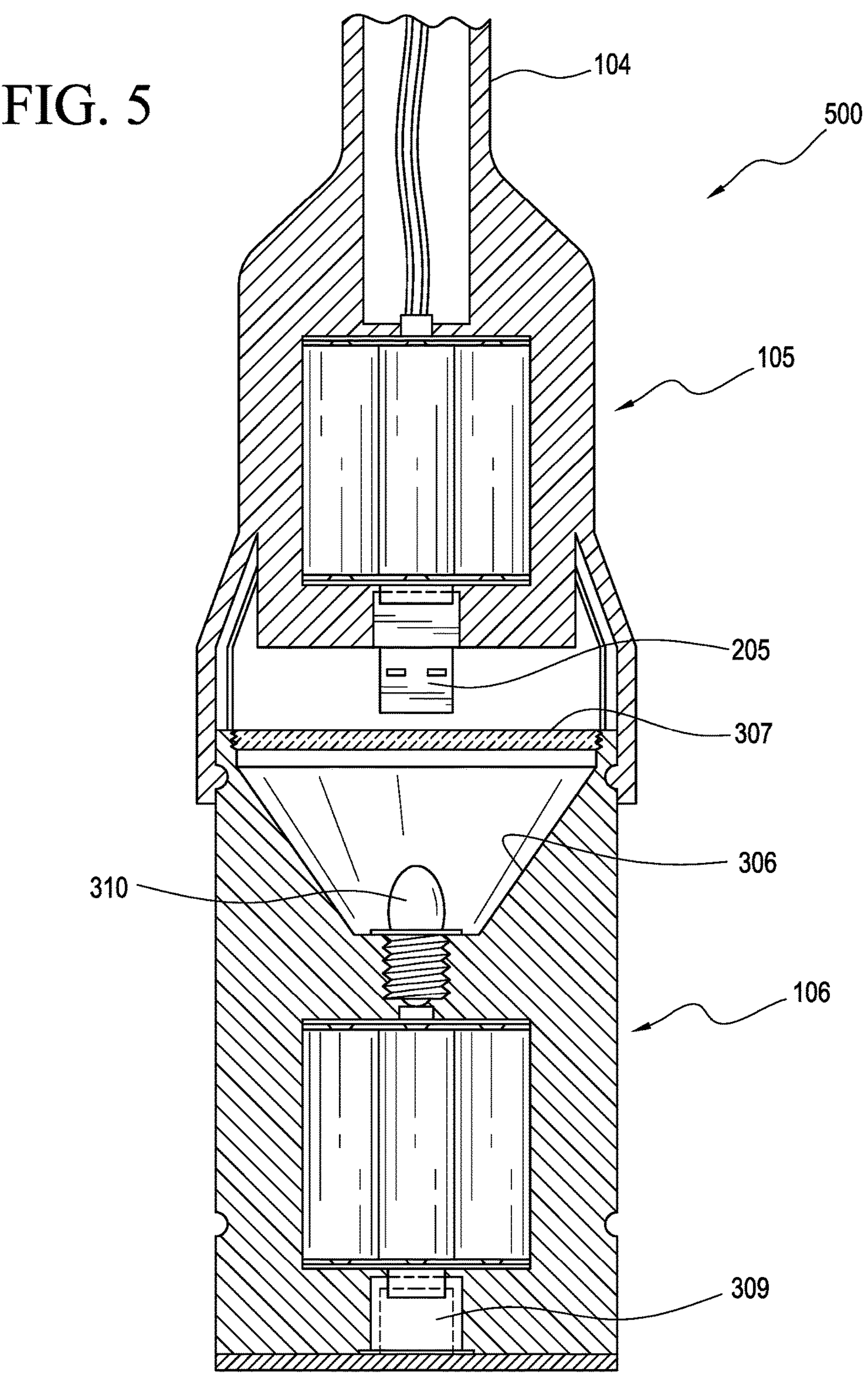
FIG. 5 depicts a conceptual diagram of the upper and lower handle units connected in a second configuration of the umbrella with fiber optic lights and a flashlight handle according to an exemplary embodiment.

In FIG. 5, a diagram of the upper and lower handle units connected in the second configuration is depicted according to an exemplary embodiment. As shown in FIG. 5, the flashlight enclosure 306 end of the lower handle unit 106 is inserted into the upper handle unit 105 in the second configuration 500. The lower set of connection groves 308 are positioned such that the filter 307 does not come into contact with the USB connector 205 within the upper handle unit 105.

Figure 6:
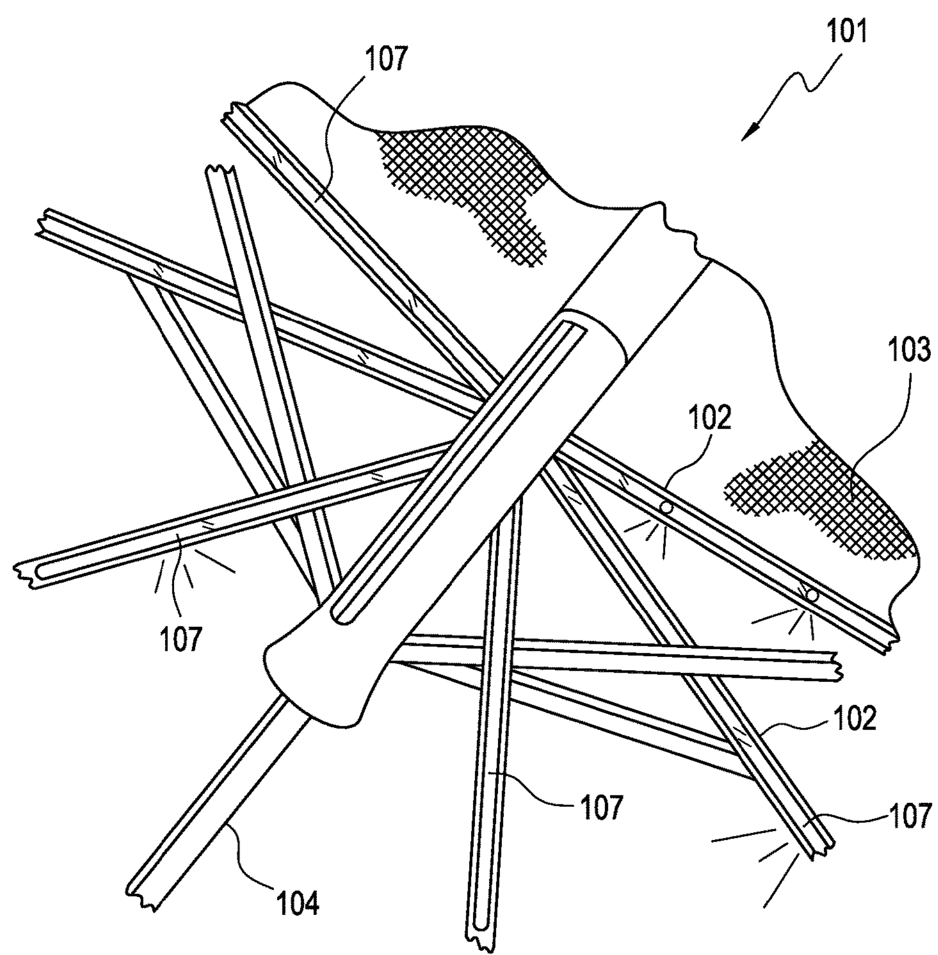
FIG. 6 depicts a conceptual diagram of the underside of the umbrella canopy of the umbrella with fiber optic lights and a flashlight handle according to an exemplary embodiment.

In FIG. 6, a conceptual diagram of the underside of the umbrella canopy of the umbrella with fiber optic lights and a flashlight handle is depicted according to an exemplary embodiment. As shown in FIG. 6, the fiber optic lights 107 are embedded within each of the struts 102 extending from the support pole 104. Each strut 102 having an elongated opening along its bottom surface to allow light from the embedded fiber optic lights 107 to emanate downward and outward from the underside of the umbrella canopy 101.

Figure 7:
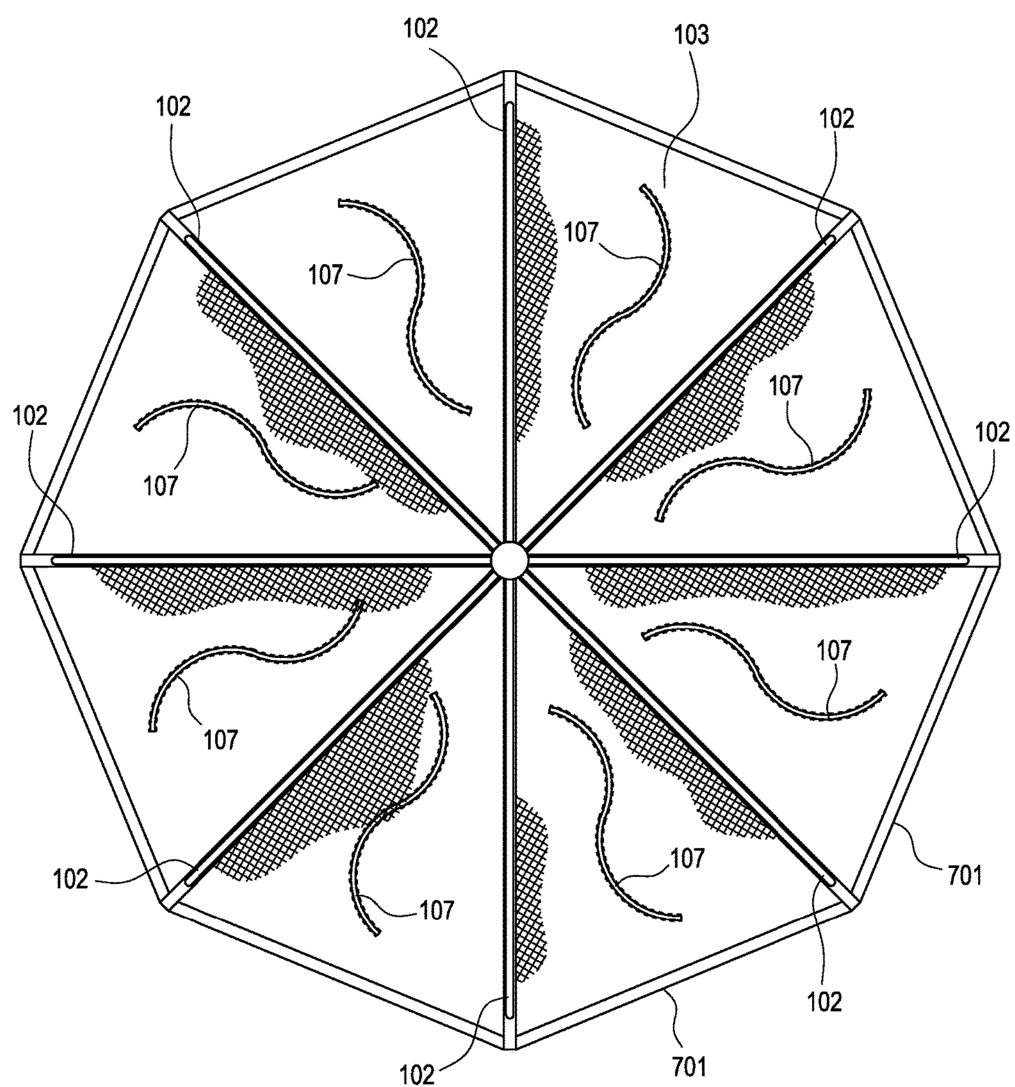
FIG. 7 depicts a conceptual diagram of the canopy of the umbrella with fiber optic lights and a flashlight handle according to another exemplary embodiment.

In FIG. 7, a conceptual diagram of the umbrella canopy of the umbrella with fiber optic lights and a flashlight handle is depicted according to another exemplary embodiment. As shown in FIG. 7, in this other exemplary embodiment the fiber optic lights 107 are also stitched into the waterproof fabric 103 of the umbrella canopy 101 as well as being embedded within the struts 102. The fiber optic lights 107 may be stitched along the edges 701 of the waterproof fabric 103 or in any other portion so as to form a pattern within the waterproof fabric 103. These fiber optic lights 107 are wired through the support pole 104 in the same manner as the fiber optic lights 107 embedded within the struts 102.

While all the embodiments discussed hereto disclose the use of fiber optic lights, a person of reasonable skill in the art will know that the invention encompasses other equivalent forms of light including a string of light emitting diodes (LEDs).

The invention claimed is:

1. An umbrella, comprising:

a support pole including an upper end and a lower end;

a canopy connected to the upper end of the support pole, the canopy including a plurality of struts that support a waterproof material and transition the canopy between an expanded open position and a contracted closed position;

an upper handle unit permanently attached to the lower end of the support pole, the upper handle unit including an upper battery compartment;

a lower handle unit removably attached to the upper handle unit, the lower handle unit including a lower battery compartment;

a plurality of fiber optic lights embedded within the plurality of struts wired directly to and electrically powered by the upper battery compartment; and a flashlight within the lower handle unit wired directly to and electrically powered by the lower battery compartment.

2. The umbrella of claim 1 further comprising an external USB port within the upper handle unit, the external USB port electrically wired to the upper battery compartment as to provide for recharging of a plurality of rechargeable batteries positioned within the upper battery compartment from an external power source.

3. The umbrella of claim 1 further comprising an external USB port within the lower handle unit, the external USB port electrically wired to the lower battery compartment as to provide for recharging of a plurality of rechargeable batteries positioned within the lower battery compartment from an external power source.

4. The umbrella of claim 1 wherein the lower handle unit may be inserted into and secured to the upper handle portion with the flashlight facing outward and away from the upper handle unit or facing inward and towards the upper handle unit.

5. The umbrella of claim 1 further comprising electrical cabling embedded within the support pole, the electrical cabling providing electrical power from the upper battery compartment to the fiber optic lights.

6. The umbrella of claim 5 further comprising a power switch in series with the upper battery compartment and the fiber optic lights that controls the application of electrical power to the fiber optic lights.

7. The umbrella of claim 6 wherein the power switch includes a dimmer.

8. The umbrella of claim 1 further comprising a power switch in series with the lower battery compartment and the flashlight that controls the application of electrical power to the flashlight.

9. The umbrella of claim 8 wherein the power switch includes a dimmer.

10. The umbrella of claim 1 further comprising a filter lens positioned in line with and in front of light emanating from the flashlight.

11. The umbrella of claim 1 further comprising additional fiber optic lights embedded within the waterproof material of the canopy.

12. The umbrella of claim 11 wherein the additional fiber optic lights form a pattern or image within a surface of the waterproof material of the canopy.

13. The umbrella of claim 1 wherein the upper handle unit includes a USB connector electrically attached the upper battery compartment and wherein the lower handle unit including a USB port electrically connected to the lower battery compartment, the USB connector electrically connecting to the USB port when the lower handle unit is attached to the upper handle unit such that the lower handle unit may be charged from the upper handle unit.

14. The umbrella of claim 13 wherein the upper battery compartment has a larger capacity than the lower battery compartment.

* * * * *